United States Patent [19]

Carratt et al.

[11] Patent Number: 4,688,891

[45] Date of Patent: Aug. 25, 1987

[54] OPTICAL DEVICE FOR SEALING A CONTAINER AND PROCESS FOR DETECTING AN ATTEMPTED BURGLARY OR BREAK-IN WITH THE AID OF THE DEVICE

[75] Inventors: Michel Carratt, Houilles; Roland Hakoun, Domont; Jean-Joseph Maurel, Antony; Serge Pecastaings, Palaiseau; Pascal Repain, Chatou, all of France

[73] Assignee: Commissariat a l'Energie Atomique, Paris, France

[21] Appl. No.: 685,902

[22] Filed: Dec. 24, 1984

[30] Foreign Application Priority Data

Dec. 29, 1983 [FR] France ................ 83 21021

[51] Int. Cl.[4] .......................................... G02B 6/04
[52] U.S. Cl. .................. 350/96.24; 350/96.20; 350/96.25
[58] Field of Search ............ 350/96.10, 96.20, 96.24, 350/96.25; 340/555, 556

[56] References Cited

U.S. PATENT DOCUMENTS

| | | |
|---|---|---|
| 3,854,792 | 12/1974 | Koelle . |
| 4,074,415 | 2/1978 | Stieff ................ 350/96.20 X |
| 4,095,872 | 6/1978 | Stieff ................... 350/96.24 |
| 4,106,849 | 8/1978 | Stieff ................... 350/96.24 |
| 4,447,123 | 5/1984 | Page et al. ............. 350/96.24 |
| 4,467,172 | 8/1984 | Ehrenwald et al. ...... 219/121 LH |

OTHER PUBLICATIONS

Navy Technical Disclosure Bulletin, vol. 7, No. 2, Dec. 1981, pp. 53-55; Washington, D.C., U.S.; A. W. Lohanick: "A Camera External Data Block".
Manufacturing Technology Note, No. HDL-TR-1729, Oct. 1980, Alexandria, Va. U.S.; R. Ulrich: "Tamper-resistant Security System".

*Primary Examiner*—Eugene R. LaRoche
*Assistant Examiner*—James C. Lee
*Attorney, Agent, or Firm*—Oblon, Fisher, Spivak, McClelland & Maier

[57] ABSTRACT

Device for sealing a container and process for detecting an attempted break-in with the aid device. In per se known manner, part of the fibres at one end of an optical fibre cable is masked and the other end of the cable is observed on illuminating the first end. According to the invention, the two cable ends are held in a seal, while masking is obtained either with the aid of a masking disk, or with the aid of a high-energy beam, which destroys the end of certain fibres. The second end of the cable is observed either with the aid of a camera, or with the aid of a sighting camera making it possible to mark the coordinates of the unilluminated fibres.

12 Claims, 5 Drawing Figures

OPTICAL DEVICE FOR SEALING A CONTAINER AND PROCESS FOR DETECTING AN ATTEMPTED BURGLARY OR BREAK-IN WITH THE AID OF THE DEVICE

BACKGROUND OF THE INVENTION

1. Field of the Invention

The present invention relates to a device for sealing or closing a container, as well as to a process making it possible to detect an attempted break-in or theft, even if the thief is successful in re-installing the closing device.

Throughout the remainder of the present text, the word "container" will be used to designate not only a receptacle which can e.g. contain radioactive waste, but also any other closed object for containing products, articles or documents which may form the object of an attempted theft or opening. Thus, the word container can designate both a receptacle and a chest, piece of furniture, cupboard or a transportable object, such as an attache case or suitcase.

2. Discussion of Background

At present, a certain number of sealing devices exist, which make it possible to detect an attempted opening of a container. Most consist of a cable which passes through the knuckle joint or closing ears of the container and whose ends are connected to a box into which has been poured a resin mass, which has cracked on cooling. These cracks form a clearly defined design which is photographed at the outset. If anyone succeeds in opening and re-sealing the box, he risks displacing the resin mass or producing new cracks and such a change can be observed by a further photograph. However, nothing is detected if the thief does not touch the box and instead merely cuts the cable and then re-forms it by splicing.

SUMMARY OF THE INVENTION

The present invention aims at obviating this disadvantage by means of a sealing device making it possible to detect any attempted break-in or burglary, no matter at what point the manipulation has taken place.

The device according to the invention comprises in per se known manner an optical fibre cable passing into at least one ring-like member integral with the container, said cable having a light entry end and a light exit end, means for masking at least part of the fibres at the cable entry end and means for observing the exit end upon illumination of the entry end. According to the invention, the two cable ends are kept sealed, which is partially light-transmitting.

According to a first embodiment, the means for masking at least part of the fibres at the cable entry end comprise a masking disk placed in front of the entry. In this case, the device can also comprise, within the actual seal, a prism arranged so as to reflect part of the light directed towards the cable entry end with the prism carrying alphanumeric characters permitting the coded marketing of the device.

According to a second embodiment, the means for masking part of the fibres at the cable entry end comprises an apparatus emitting a high-energy beam on the cable entry end in order to darken or hide the end of certain fibres, means for displacing the emitting apparatus in order to direct the beam onto a specific fibre and means for marking the coordinates of the fibres, of which one end has been darkened or hidden.

In this case, the cable exit and observation means upon illumination of the entry end comprise a sighting camera and means for marking coordinates of non-illuminated fibres on the exit face of the cable.

According to a third embodiment combining the first and second embodiments, the means for masking part of the fibres at the end of the cable comprise an apparatus for darkening or hiding the end of certain fibres, means for displacing the said apparatus, means for marking the coordinates of the fibres whose end is hidden or darkened and means for masking part of the fibres at the entry end by means of a masking disk.

In this case, the cable exit end observation means upon illumination of the entry end comprise a sighting camera means for marking the coordinates of nonilluminated fibres according to the obtention mode by a darkening apparatus and by a masking disk.

In the three embodiments, it is advantageous for the seal to have two cavities, in each of which is located one end of the cable, each cable end being placed within a tube, which is itself maintained within said cavity, the tube being crimped onto the cable.

The invention also relates to a process for sealing a container and for detecting an attempted break-in. According to the main feature of this process, it comprises passing an optical fibre cable into at least one ring-like member integral with the container, said cable having a light entry end and a light exit end and the two cable ends are placed in a seal, whereof at least part is light-transmitting.

If the masking disk system is used, the sealing operation is performed, illumination takes place by the entry face and the hidden fibres are marked on the exit face.

On using the coded marking system with or without a marking disk, the process also comprises hiding the end of certain fibres at the cable entry end using an apparatus emitting a high-energy beam, supplying a light beam to the cable entry end and marking the coordinates of the non-illuminated fibres on the exit face and, during a subsequent inspection, the cable entry face is illuminated, the coordinates of the non-illuminated fibres are marked at the exit end and a comparison takes place with what was noted during the fitting of the device.

The comparison of the coordinates of the non-illuminated fibres during the fitting of the device and during the subsequent ispection can take place by a statistical method. It is also possible to convert the coordinates of the non-illuminated fibres at the cable exit end into a coded message, the same code being used for converting the coordinates of the non-illuminated fibres into a message during a subsequent inspection.

It is also possible to illuminate by the exit face and determine the location of the masked fibres on the entry face. Systematic coding can then make it possible to reidentify a container, whose identity would have been lost for some reason if the location of the sealed fibres at the entry is always the same as a function of the aforementioned coding.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
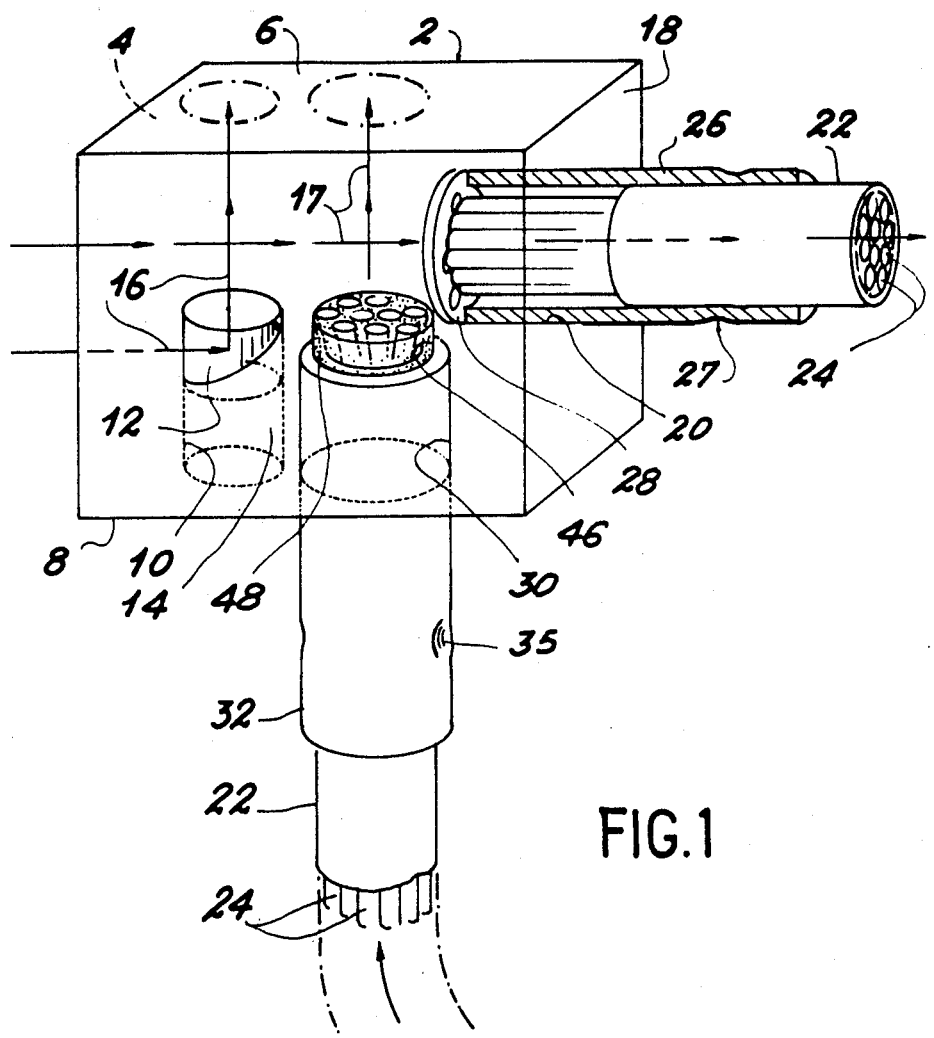
FIG. 1 a diagrammatic perspective view of the seal used in the first embodiment of the device according to the invention.

FIG. 1 shows that the device according to the invention essentially comprises a seal 2, which is partly made from a light-transmitting material and which is substantially shaped like a rectangular parallelepiped. It has a light entry face 4 for receiving the light emitted by a source and an exit face 6 enabling the light which has passed through the device to be supplied to a camera. The parallelepipedic shape is not obligatory, the essential point being that there is an entry face and an exit face which are planar and perpendicular to one another, the remainder being modifiable for ease of use.

On face 8 of seal 2 which is opposite to the exit face 6 is formed a cavity 10, into which is introduced a prism 12, which is locked in position by means of a plug 14. Prism 12 is also transparent and is shaped like a truncated cylinder with a plane forming an angle of 45° with its axis, which is perpendicular to faces 6 and 8 of seal 2. Thus, a light beam arriving perpendicularly on the entry face 4, like beam 16, is reflected at right angles and passes out by the exit face 6 perpendicular thereto.

The face 18 of body 2 opposite to the entry face 4 has a cylindrical cavity 20, whose axis is perpendicular to faces 4 and 18 and into which is introduced a first end of an optical cable 22 constituted by a certain number of fibres 24. Tube 26 is a moulding insert which cannot be pulled out and which makes it possible to secure cable 22 by crimping. The tube is deformed by producing marks such that the possible pulling out of the cable destroys the external covering thereof and prevents any discrete re-fitting. Moreover, if the cable has a braided metal sheath, the "points" or other reliefs due to the clamp or clip and which produce "puncture" in tube 26 or 32 lock the optical cable in an irreversible manner. If the fibers are damaged at the time of crimping, this is taken into account by the examination made after fitting the seal.

In addition, the deformation of the sheath has a relative elasticity and after any pulling out, there would be a return swelling, which would prevent reintroduction. A substantially circular masking disk 28 is placed on the bottom of cavity 20 prior to the introduction of tube 26 and cable 22. It is made from a transparent material and contains as an inclusion particles which stop light, e.g. a silicone disk irregularly filled with copper particles. Thus, certain of the fibres 24 are masked, whereas others are either unmasked or are only partly masked.

In the same way as face 18, face 8 of seal 2 is provided, by moulding, with an insert in the form of tube 32, which makes it possible to secure by crimping the other end of cable 22, tube 32 being deformed at 35. The ends of the fibres are either expanded or not expanded in expansion chamber 46. Their random positions may or may not be fixed by a sealing resin 48. Thus, a light beam, like beam 17, which has penetrated by entry face 4, but which has not been reflected by prism 12 enters cable 22 through disk 28 and follows fibres 24 up to the other end of the cable and is diffused perpendicularly to the exit face 6.

A description will now be given of the use of this device with reference to FIG. 2, which shows the seal 2, into which has been fixed the two ends of cable 22 after passing the latter through the closing ears 31, 33 of a container, in the manner of a padlock. A light source 34 and its associated waveguide 36 are connected to seal 2 by an orifice made in connector 50, which makes it possible to supply light perpendicularly to the entry face 4 of seal 2.

Figure 3:
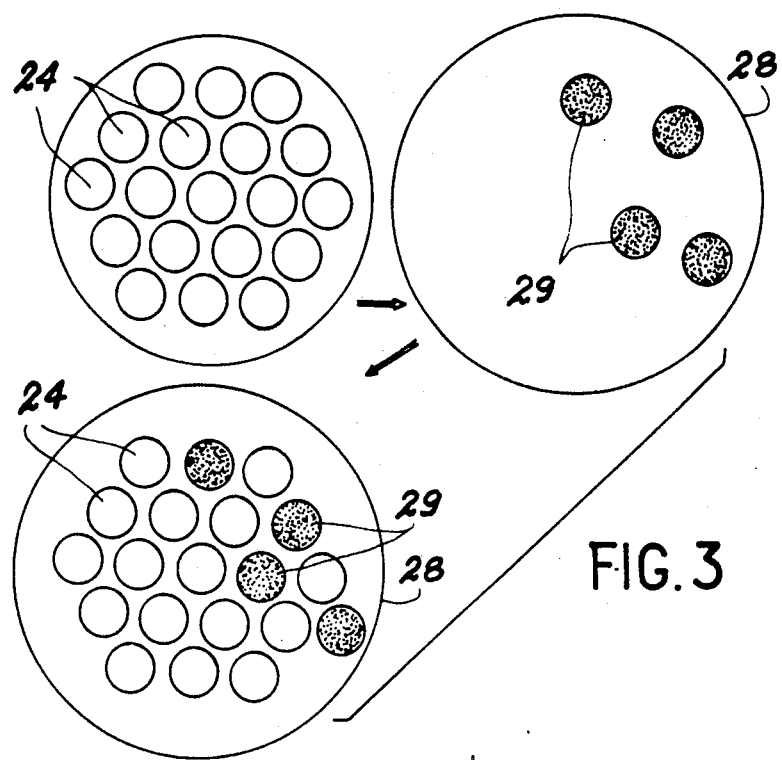
FIG. 3 the effect obtained on masking one end of the optical fibre cable with the aid of a masking disk.

Part of the light beam passes through the masking disk 28 and then along cable 22, before arriving at a camera 38, whilst another part is reflected by prism 12 and supplied to camera 38. The face 6 of the seal is in contact with the entrance orifice of the camera. Focusing is fixed and it takes place on the plane common to the exit face of prism 12 and the exit face of cable 22. Thus, an image 40 formed from two parts 42, 44 is obtained, 42 being the image of the end of cable 22 with certain fibres illuminated and others not and possibly empty spaces due to the expansion of the fibre bundle. This is due to the presence of the masking disk 28, as illustrated in FIG. 3, where it is possible to see the shape thereof, together with the light-absorbing inclusions 29. FIG. 3 illustrates the effect obtained at the entry or inlet of cable 22 and not the image appearing on the photograph. The other part 44 of the latter is the image of the exit face of prism 12, which carries alphanumeric characters letters and figures and which makes it possible to encode each sealing device.

Figure 4:
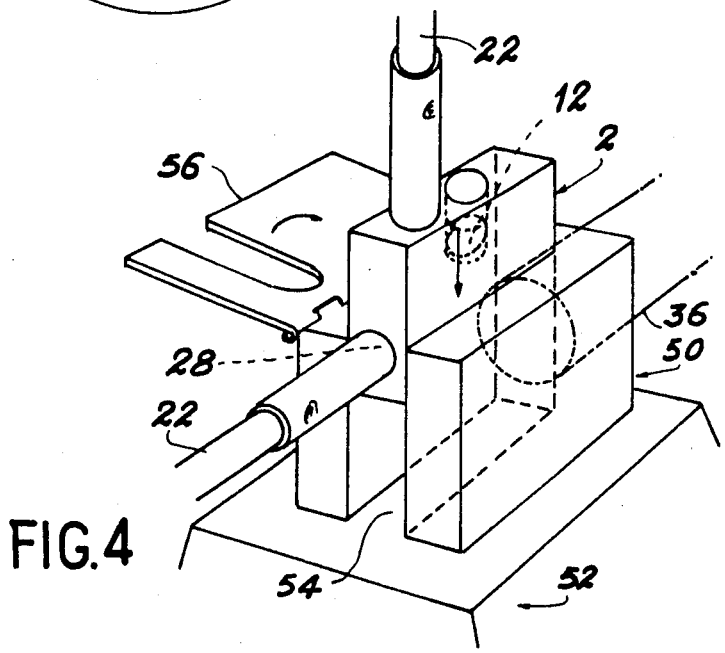
FIG. 4 a diagrammatic perspective view showing the container making it possible to lock the seal in position relative to an emission waveguide and a reading device.

FIG. 4 more precisely shows the construction of connector 50. It can be seen that camera 38 is equipped with a frustum-shaped adaptor 52, connector 50 being placed at the end of the latter which is opposite to camera 38. Connector 50 is U-shaped and the two branches define between them a slot 54, into which is introduced the seal 2, the arrangement being such that the light leaving by the exit face is supplied to the camera within adaptor 52. The presence of the latter prevents the entry of any parasitic light beam and only the images of the prism and the end of cable 22 appear on the photograph. A pivoting blade 56 locks the seal 2 in position in slot 54 and, as connector 50 is fixed in a clearly defined position on element 52, seal 2 is perfectly positioned with respect to the camera 38 and with respect to the waveguide 36.

When the device is placed on the container, a first photograph showing the initial state is taken. Source 34 with its guide 36 is then removed from the connector 50 integral with camera 38, the latter being used again during a subsequent inspection. If in the meantime, there has been a break-in or attempted break-in, this can be detected, even if the seal 2 and cabel 22 has been re-installed. Thus, if the cable is cut and it is re-formed by splicing, or if seal 2 is pulled out and then re-fitted, or on transposing the seals from two different containers, the image obtained on the camera would be different from the initial image. Optionally, the references of the prism would have been changed, but in particular the image of the cable would be different, because it would have undergone a certain twisting, or certain fibres would have been broken during this manipulation and there would have been a change in their position relative to the masking disk 28. Thus, it is impossible to replace the cable precisely in its initial position, or not to destroy certain fibres.

No matter whether the ends of the fibres have or have not been expanded in expansion chamber 46 and no matter whether or not they are sealed in position, their arrangement defines a single diffraction pattern, which prevents any reconstitution identical to the initial state after an attempt at removing cable 22 from tube 32.

Figure 2:
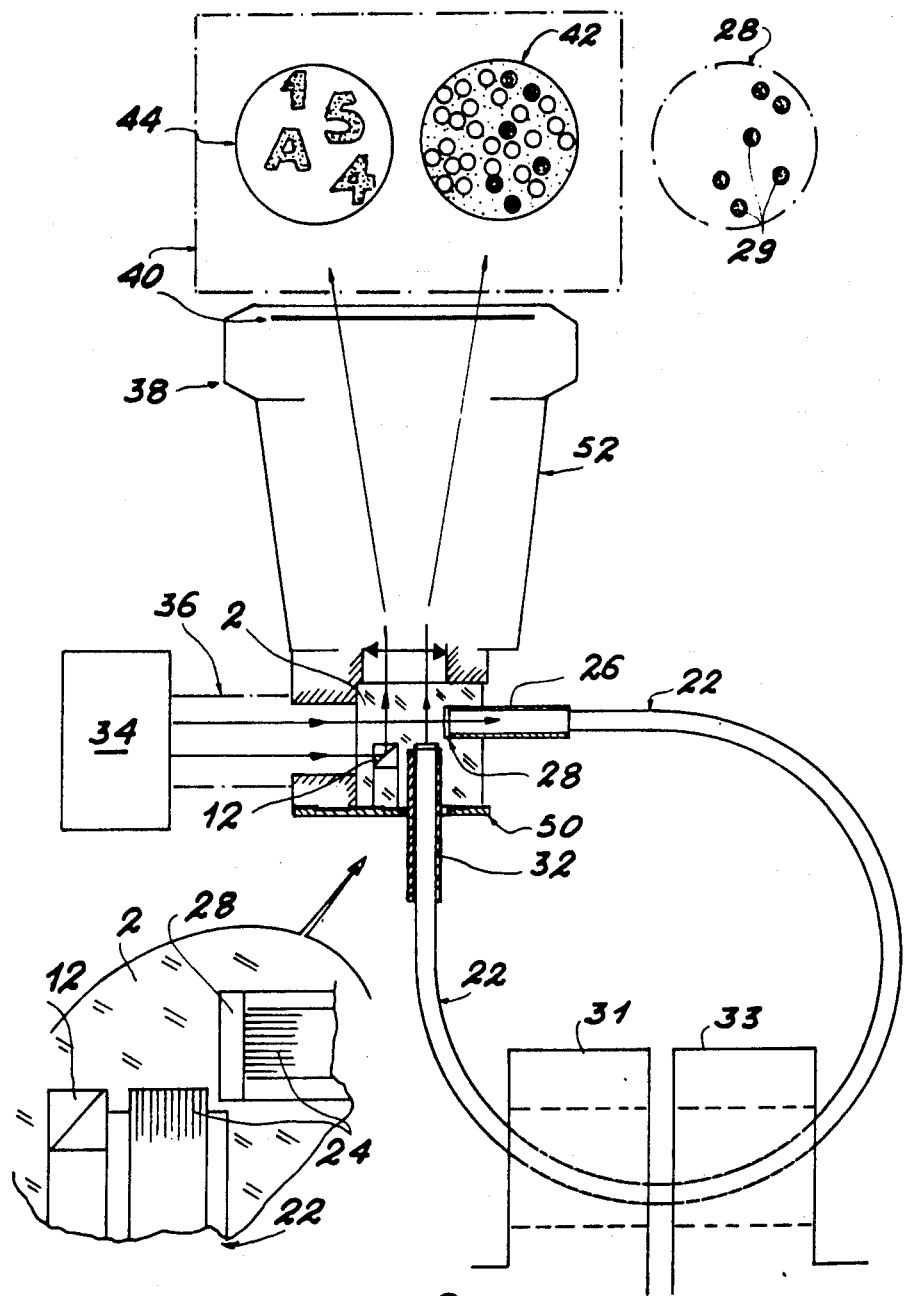
FIG. 2 a diagrammatic view of the complete device according to the invention in the first embodiment.

Moreover and as can be seen in detail in FIG. 2, the ends of cable 22 within the seal are very close to one another, which makes it very difficult or even impossible to attempt to cut through the seal without touching the cable. It is also impossible to cover certain parts of the outer surface of the seal with a light-opaque coating, in order to make it even more difficult to saw through.

FIG. 2 also shows that the prism 12 is very close to the exit end of cable 22 within seal 2. This arrangement, which is advantageous for having the two images 42, 44 very close to one another on photograph 40, is not obligatory and the distance between the prism and the cable will be chosen as a function of the available reading devices.

Figure 5:
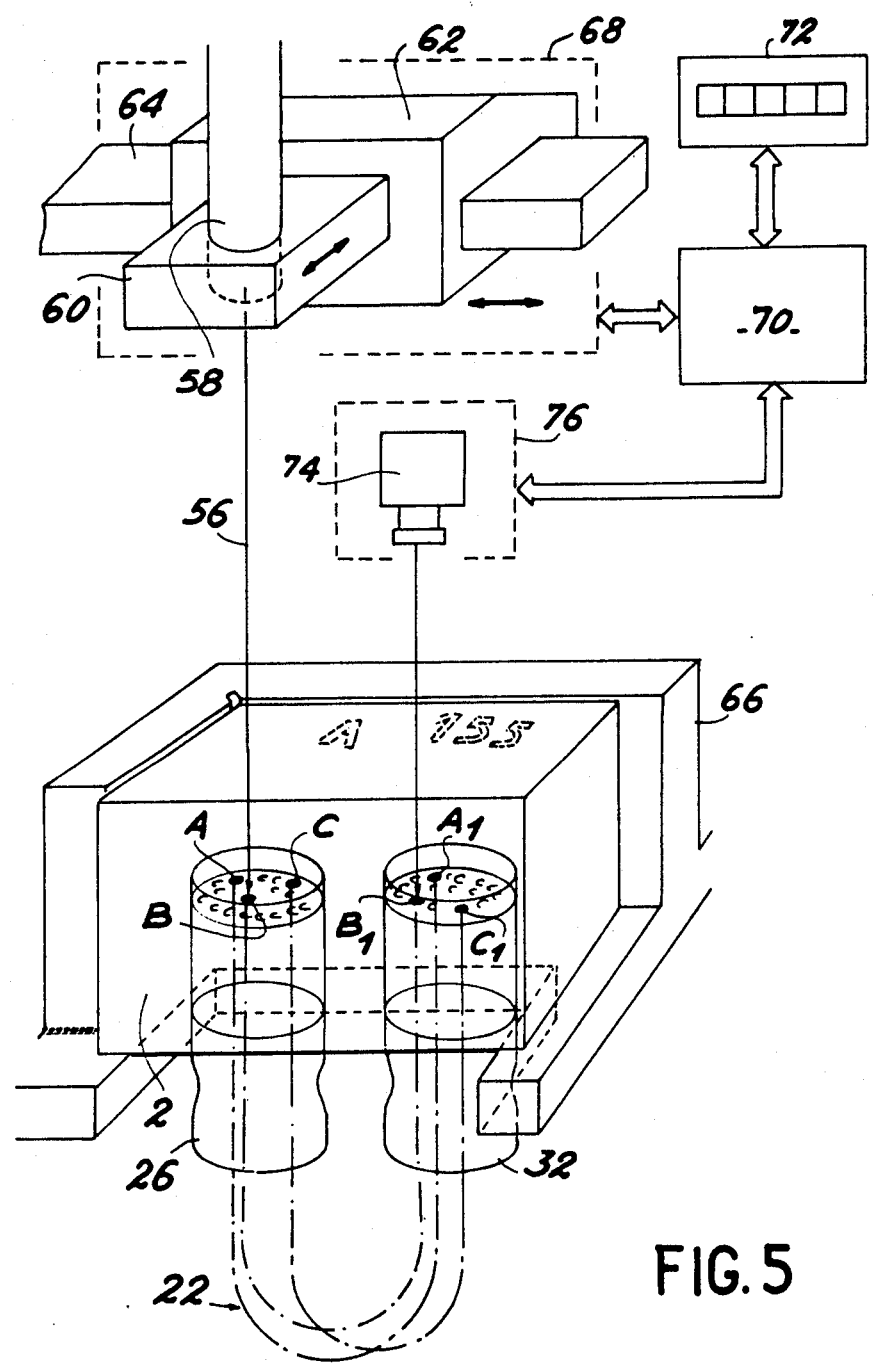
FIG. 5 a diagrammatic perspective view illustrating a second embodiment of the device according to the invention.

FIG. 5 illustrates a second embodiment of the device according to the invention, where once again there is a cable 22, whose ends are held in seal 2 but, in this case, no masking disk 28 is used. Masking is obtained with the aid of a high-energy beam, e.g. a laser beam 56 emanating from a guide 58, which is connected to a not shown emitting apparatus. Guide 58 is mounted on a support 60, which is mobile in translation relative to a carriage 62, which moves in a perpendicular direction relative to frame 64. This makes it possible to direct beam 56 onto a clearly defined fibre, whose coordinates are to be marked, because the seal 2 is held on a support 66. The fibre end is hidden or darkened and consequently no longer transmits light. Thus, a black point is obtained at the other end, on illuminating the first end. In the presently described embodiment, the ends of three fibres A, B, C corresponding to points $A_1$, $B_1$, $C_1$ at the exit end of the cable are hidden or darkened. Elements 60, 62, 64 are associated with a system 68 for marking displacements of laser beam 56, which transmits the coordinates of fibres A, B, C, whilst taking into account a transfer function, to a computer 70, which is optionally associated with a coding system 72. Thus, it is possible to convert the coordinates of fibres A, B, C into a message giving information on the loading of the container, its destination, etc. The arrangement of FIG. 5 can be provisionally used for marking prior to sealing, before fitting, for sealing the fibres with a view to coding, the final marking of the special configuration of the seal taking place following final fitting, in order to take into account the fibres which may have been touched at the time of sealing.

As the ends of fibres A, B and C are melted, said part of the cable is illuminated and the other end is observed with the aid of a camera 74, or an image guide, associated with a system 76 for marking the coordinates of points $A_1$, $B_1$, $C_1$. System 76 is also connected to computer 70 and to coding device 72, in order to convert into a message the coordinates of points $A_1$, $B_1$, $C_1$, whilst taking account of the cable transfer function.

Thus, during a subsequent inspection, e.g. during transportation of when the container has arrived at its destination, the first end of the cable is illuminated and the other end is observed with a camera similar to camera 74. The operators knowing the code used on fitting the device with the determination of the coordinates of points $A_1$, $B_1$, $C_1$ makes it possible to reconstitute the message. If a message different from that expected is obtained, or alternatively an incomprehensible message, a manipulation has taken place.

Thus, even in this second version, a photographic inspection can take place as in the first. It is also possible to use a statistical method in order to initially confirm that there is an at least approximate conformity between the observed image and the initial image, even if it subsequently involves performing a more detailed inspection.

Thus, the device according to the invention is of particular interest, because it makes it possible to detect in a simple and reliable manner any attempt at opening the container and any manipulation of the sealing device.

Moreover, it would not pass beyond the scope of the invention to introduce certain variants. For example, in the first version, an automatic reading system with comparative memories can advantageously replace the camera. This system makes it possible to observe the complete image obtained of the fibre ends and the coded symbols of each seal. Moreover, as a result of image guides, this can be transferred to a remote control panel with optionally the connection of a remote alarm, which is triggered in the case of noncorrespondence between the images during a check, the system permitting a virtually continuous, centralized periodic inspection.

Finally, it is possible to take certain precautions in order to avoid errors of interpretation during an inspection. For example, the cable should be given a good mechanical strength so that fibres are not damaged during an impact or accident. For this purpose, the fibres can be placed within a rubber sheath, surrounded by a metal sheath, which is itself surrounded by an outer sheath. Moreover, for crimping the tubes, use is preferably made of a multiple notch clamp or clip, which exerts a constant pressure on the tube, no matter who is the operator. Thus, this limits the destruction of fibres around the cable periphery, which is not very disturbing in the first version, but would be more prejudicial in the second version, where there are fewer fibres available for coding.

Finally, in the second version, it is not obligatory for the two cable ends to be in the vicinity of the same face of the seal. It is possible to envisage another arrangement, in order to make it more difficult to attempt to saw through a seal and, as in the first version, part of the outer surface thereof can be covered with an opaque coating.

It is also possible to envision the case where the two cable ends are not in the same seal. This arrangement makes it possible to use a longer cable, so as to keep together a relatively large number of containers.

What is claimed is:

1. A device for sealing a container, of the type comprising an optical fibre cable passing into at least one ring-shaped member integral with the container, said cable having a light entry end and a light exit end, means for masking at least part of the fibres at the cable entry end and means for observing the exit end upon illumination of the entry end, wherein the two ends of the cable are held in a seal which is at least partly light-transmitting, and said device further comprising, within said seal, a prism arranged so as to reflect part of the light directed towards the cable entry and, said prism carrying alpha numeric characters permitting the coded marking of said device.

2. A device according to claim 1, wherein the means for masking at least part of the fibres at the cable entry end comprise a masking disk placed in front of said entry end.

3. A device according to claim 1, wherein the means for masking part of the fibres at the cable entry end comprise an apparatus emitting a high-energy beam, on the cable entry end in order to darken or hide the end of certain fibres, means for displacing the said emitting apparatus in order to direct the beam onto a specific fibre and means for marking the location of the fibres with respect to said seals, of which one end has been darkened or hidden.

4. A device according to claim 3, wherein the means for observing the cable exit end upon illumination of the entry end comprises a sighting camera and means for marking the location of the non-illuminated fibres with respect to said seal, on the cable exit face.

5. A device according to claim 1, wherein the seal has two cavities, each of which houses a cable end, each cable end being placed within a tube, which is itself held in the cavity, the tube being crimped onto the cable.

6. A process for sealing a container wherein it comprises passing an optical fibre cable into at least one ring-shaped member integral with the container, said cable having a light entry end and a light exit end, the two cable ends are placed in a seal, whereof at least part is light-transmitting, using an apparatus emitting a high-energy beam on the end of fibres at the cable entry end in order to darken or hide the end of certain ones of said fibers, beam is supplied to the cable entry end and the location of the non-illuminated fibres with respect to said seal are marked on the exit face and during a subsequent inspection, the cable entry face is illuminated, the location of said non-illuminated fibres at the exit end is marked and compared with what was noted during the fitting of the device.

7. A process according to claim 6, wherein a statistical method is used for comparing said location of the fibres during the fitting of the device and during the subsequent inspection.

8. A process according to claim 6, wherein, during the fitting of the device, said location of the fibres at the cable exit end is converted into a message by means of a code, the same code being used for converting said location of the fibres into a message during a subsequent inspection.

9. a process according to claim 6, wherein a light beam is supplied to the cable exit end and said location of the fibres are marked on the exit face, thereby making it possible to reidentify a container whose marking has been lost.

10. A device for sealing a container, of the type comprising an optical fibre cable passing into at least one ring-shaped member integral with the container, said cable having an light entry end and a light exit end, means for masking at least part of the fibres at the cable entry end and the means for observing the exit end upon illumination of the entry end, wherein said two ends of the cable are held in a seal which is at least partially light-transmitting and wherein said means for masking said fibres at the cable entry end comprises an apparatus emitting a high-energy beam on the cable entry end in order to darken or hide the end of certain ones of said fibres, means for displacing the said emitting apparatus in order to direct the beam on to a specific fibre and means for marking the location of the fibres with respect to said seals, of which one end has been darkened or hidden.

11. A device according to claim 10, wherein the means for observing the cable exit end upon illumination of the entry end comprises a sighting camera and means for marking the location of the non-illuminated fibres on the cable exit face.

12. A device according to claim 10, wherein said seal has two cavities, each of which houses a cable end, each cable end being placed within a tube, which is itself held in the cavity, the tube being crimped onto said cable.

* * * * *